United States Patent [19]

Tsuji et al.

[11] 3,910,816

[45] Oct. 7, 1975

[54] METHOD AND APPARATUS FOR REMOVING AN INCORE NEUTRON FLUX MONITOR

[75] Inventors: Teruaki Tsuji; Shigeru Watanabe, both of Yokohama, Japan

[73] Assignee: Tokyo Shibaura Denki Kabushiki Kaisha, Japan

[22] Filed: July 1, 1974

[21] Appl. No.: 485,004

[30] Foreign Application Priority Data

Sept. 5, 1973 Japan.............................. 48-99172

[52] U.S. Cl.............................................. 176/19 R
[51] Int. Cl.............................................. G21c 19/20
[58] Field of Search................................ 176/17, 19

[56] References Cited
UNITED STATES PATENTS

| | | | |
|---|---|---|---|
| 3,354,040 | 11/1967 | Frame et al....................... | 176/19 R |
| 3,664,922 | 5/1972 | Diwinsky et al. ................. | 176/19 R |
| 3,751,333 | 8/1973 | Drummond et al............... | 176/19 R |

Primary Examiner—Harvey E. Behrend
Attorney, Agent, or Firm—Stevens, Davis, Miller & Mosher

[57] ABSTRACT

In a nuclear reactor wherein four square shaped fuel rod assemblies are disposed in respective square shaped openings defined by crossing grids of a upper supporting plate, and an in-core monitor is disposed at a cross-point of the grids, the in-core monitor is removed by removing four fuel rod assemblies adjacent the in-core monitor, removing one fuel rod assembly from each of three square shaped openings about the in-core monitor, inserting a holder-cutter assembly into a large vacant space formed by removing the four fuel rod assemblies for holding the upper portion of the in-core monitor, inserting a clamping device into one small vacant space formed by removing one of the three fuel rod assemblies which is diagonally opposite the removed fuel rod assembly for clamping a portion of the in-core monitor which is spaced apart from the portion thereof held by the holder of the holder-cutter assembly, severing the in-core monitor into two sections by operating the cutter, and removing to the outside of the reactor the severed two sections while they are held by the clamping device and the holder, respectively.

7 Claims, 10 Drawing Figures

METHOD AND APPARATUS FOR REMOVING AN INCORE NEUTRON FLUX MONITOR

BACKGROUND OF THE INVENTION

This invention relates to a method and apparatus for taking out a neutron flux monitor from a nuclear reactor and more particularly to a method and apparatus for removing the neutron flux monitor in such abnormal condition wherein the spring for securing the neutral flux monitor in the reactor sticks and wherein conventional method and apparatus can not take out the monitor.

During operation of a nuclear reactor, it is necessary to constantly supervise the neutron flux distribution in the reactor so as to always provide an adequate neutron flux distribution by inserting a rod shaped neutron flux monitor (for brevity, hereinafter termed "in-core monitor") between fuel elements. The in-core monitor is usually constructed to engage its upper end with a cross-point of the grids of a upper supporting plate by utilizing the expanding force of a spring disposed at the top of the in-core monitor. Such a spring is usually contained in a cylindrical casing for the purpose of keeping the linearlity of the spring force so that the spring has normal or requisite resiliency at the initial state, and the in-core monitor can be readily removed by depressing it slightly with a special tool designed for this purpose. After an extended period of operation, for example more than 1 year, as the in-core monitor is irradiated with a large quantity of neutrons the spring often sticks to the cylindrical casing whereby the spring loses its resiliency thus, making it impossible to remove the in-core monitor by the conventional method. Under these conditions, correct supervision of the operation of the nuclear reactor can not be assured and in the worst case results in the damage of the nuclear reactor. If the in-core monitor were forcibly removed its cylindrical casing would be cracked or ruptured, thus diffusing fission products in the reactor and damaging reactor core structure. When small fittings such as bolts and nuts are inadvertently dropped into the reactor vessel during the removal operation their recovery is almost impossible. When the operation of the reactor is resumed without removing them, the reactor core might be damaged.

SUMMARY OF THE INVENTION

It is an object of this invention to provide an improved method and apparatus for removing an in-core monitor which has been damaged to such extent that cannot be removed by conventional method and apparatus without causing fusion of fission products in the reactor.

Another object of this invention is to provide a novel method and apparatus for removing an in-core monitor capable of operating from outside of the reactor.

According to one aspect of this invention, in a nuclear reactor wherein four square shaped fuel rod assemblies are disposed in respective square openings defined by crossing grids of a upper supporting plate, and an in-core monitor is disposed at a cross-point of the grids, there is provided a method of removing the in-core monitor comprising the steps of removing four fuel rod assemblies from a square shaped opening having a diagonal passing through the cross-point, removing one fuel rod assembly from each of three square shaped openings about the in-core monitor and having diagonals respectively passing through the cross-point, inserting a holder-cutter assembly into a large vacant space formed by removing the four fuel rod assemblies for holding the upper portion of the in-core monitor, inserting a clamping device into one small vacant space formed by removing one of the three fuel rod assemblies which is diagonally opposite the removed fuel rod assembly for clamping a portion of the in-core monitor which is spaced from the portion thereof held by the holder of the holder-cutter assembly, severing the in-core monitor into two sections by operating the cutter of the holder-cutter assembly, and removing to the outside of the reactor the severed two sections while they are held by the clamping device and the holder, respectively.

According to another aspect of this invention, in a nuclear reactor wherein four square shaped fuel rod assemblies are disposed in respective square shaped openings defined by crossing grids of a upper supporting plate, and an in-core monitor is disposed at a cross point of the grids, there is provided apparatus for removing the in-core monitor comprising a holder-cutter assembly adapted to be inserted into a large vacant space formed by removing four fuel rod assemblies from one of the square shaped openings, a clamping device adapted to be inserted into a small vacant space formed by removing one of the fuel rod assemblies about the in-core monitor, the clamping device including a vertical shaft operable in the vertical direction and a holding means for holding the in-core monitor, and means for operating the holder-cutter assembly and the clamping device from outside of the nuclear reactor.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENT

Figure 1:
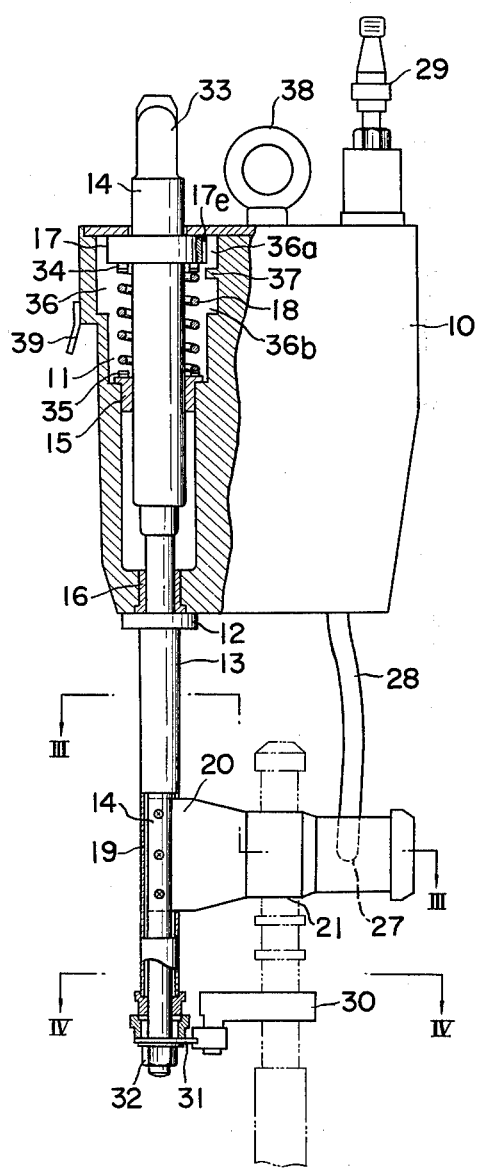
FIG. 1 is a side view, partly in section, of a clamping device embodying the invention for holding the upper portion of a neutron flux monitor.
Figure 2:
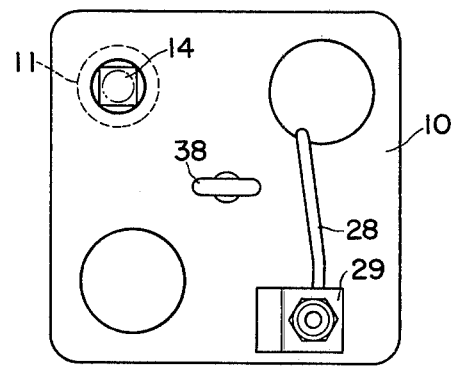
FIG. 2 shows a top plan view of the clamping device shown in FIG. 1.
Figure 3:
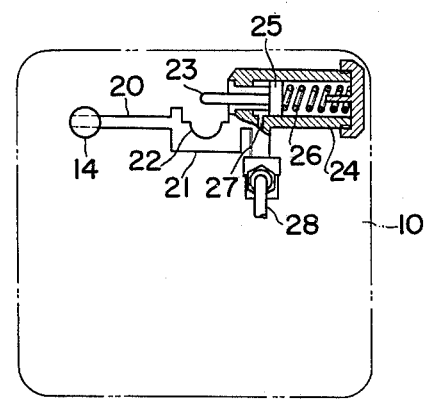
FIG. 3 is a cross-sectional view taken along a line III—III in FIG. 1.
Figure 4:
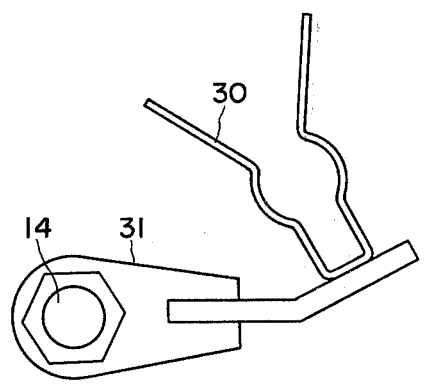
FIG. 4 is a cross-sectional view taken along a line IV—IV in FIG. 1.

Referring now to the accompanying drawings illustrating a preferred embodiment of the apparatus of this invention, the clamping device shown in FIGS. 1 through 4 and adapted to clamp the upper portion of an in-core monitor comprises a main body 10 having a square cross-sectional configuration and provided with a stepped through opening 11 near its one corner, the diameter of the through opening decreasing from upper toward the lower. A shaft 14 provided with a flange 17 near its upper end extends through opening 11 and is journaled by a pair of bearings 15 and 16. A protective cover 13 surrounding the lower portion of shaft 14 is secured to the lower surface of main body 10 by means of a flange 12 provided for the upper end of the cover 13. The flange 17 and hence the shaft 14 is biased upwardly by means of a spring 18 interposed between bearing 15 and flange 17. A portion of the protective cover 13 is cut away as at 19 to receive a web 20 interconnecting the shaft 14 contained in the protective cover 13 and a monitor holder 21 which is provided with a semicircular recess 22 and an anchor rod 23 operated by a piston 25 contained in a cylinder 24. The cylinder 24 is secured to the outer end of the monitor holder 21 and the piston 25 is moved to the right against the bias of a spring 26 by liquid under pressure supplied to the lefthand side of the piston 25 through an inlet port 27 and a flexible pipe 28 with its opposite end connected to a fixture 29 mounted on the main body 10. A clamping member 30 is secured to the lower end of shaft 14 by means of an arm 31 and a nut 32. The upper end of shaft 14 is formed with a square portion 33 for receiving a tool utilized to rotate the shaft over a predetermined angle, about 135° for example. Sliding washers 34 and 35 each including two washer plates are interposed between the opposite ends of the spring 18 and the flange 17 and bearing 15, respectively. The space 36 of the opening 11 which is used to accommodate the flange 17 is divided into a first space 36a and a second space 36b when a projection 37 is received in a notch 17b provided for flange 17. Under these conditions, flange 17 can move freely between the first and second spaces 36a and 36b. An eyebolt 38 is secured to the upper surface of the main body 10 for hanging the same and a tongue 39 is connected to the lefthand side of the main body 10 for urging it against a control grid 102 (see FIG. 8).

A cutter and a holder unitary secured thereto for holding the lower portion of a in-core monitor will now be described with reference to FIGS. 5 to 8. The cutter 60 comprises a main body 61, a letter L shaped arm 62 secured to one end of the main body 61 and a support 63 having a cutting blade 63a supported on the inside of the outer leg of arm 62. A cylinder bore 64 is provided through the main body to accommodate a piston 65, the piston rod thereof carrying a support 67 for a cutting blade 63b cooperating with cutting blade 63a. The support 67 is guided by a guide rod 68. Pressurized liquid is supplied to the cylinder bore 64 through an inlet port 69 and to the actuator of the holder 72 for the lower portion of the in-core monitor to be described hereunder through a conduit 70.

Figure 5:
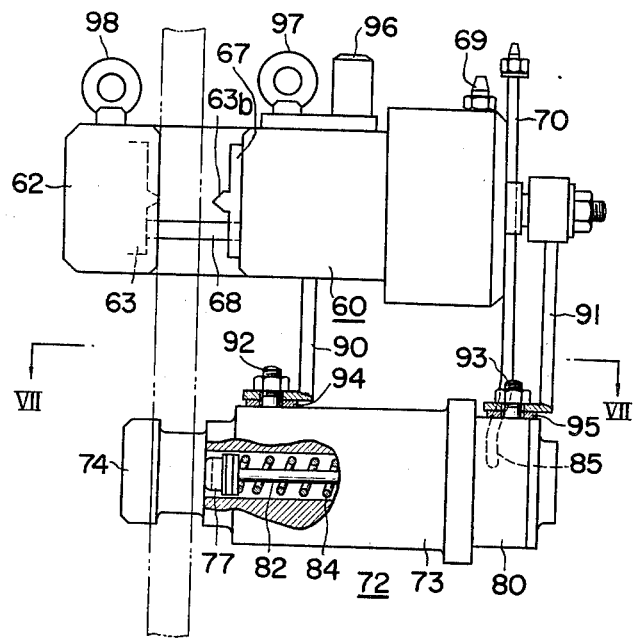
FIG. 5 is a diagrammatic representation, partly in section, of apparatus embodying the invention wherein a cutter and a holding device are combined into an integral unit.
Figure 6:
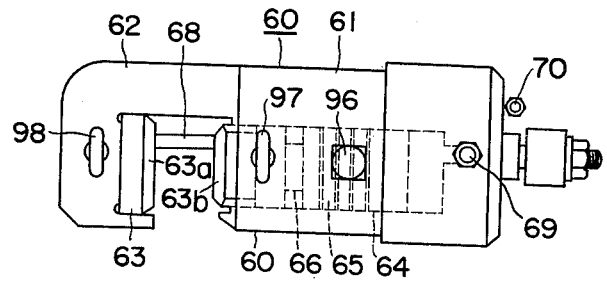
FIG. 6 is a top plan view of the cutter shown in FIG. 5.
Figure 7:
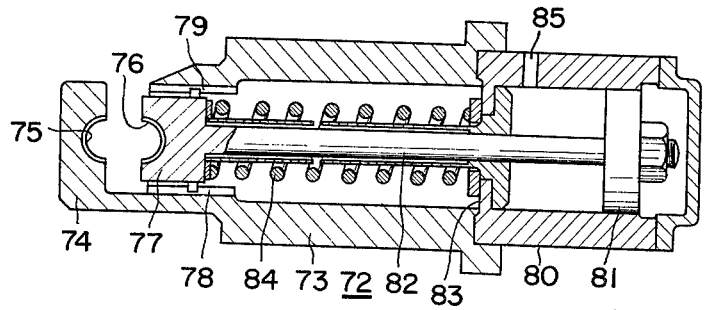
FIG. 7 shows a longitudinal sectional view of the holding device shown in FIG. 5.

As shown in FIGS. 5 and 7, the holder 72 comprises a cylindrical member 73 having a clamping member 74 projecting outwardly from one end thereof, the clamping member being provided with a semicircular tapped clamping surface 75 on its inner surface. The other clamping member 77 formed with a tapped clamping surface 76 cooperating with the clamping member 74 is mounted at the opening of the cylindrical member 73 and guided by rails 78 and 79 to be movable in the axial direction but not to rotate. A cylinder 80 containing a piston 81 is connected to the righthand end of the cylindrical member 73 for operating the movable clamping member 77 by a piston rod 82. A coil spring 84 surrounding the piston rod 82 is interposed between the movable clamping member 77 and a partition wall 83 at one end of cylinder 80. The cylinder 80 is provided with an inlet port 85 for the pressurized liquid. As shown in FIG. 5, the holder 72 is integrally connected to cutter 60 by connecting rods 90 and 91 and bolts 92 and 93. It is advantageous to interpose resilient washers 94 and 95 between the lower ends of rods 90 and 91 and cylindrical member 73 and cylinder 80, respectively. A post 96 to be engaged by an operating rod, not shown, and eye-bolts 96 and 98 are secured to the upper surface of the cutter 60.

Figure 8:
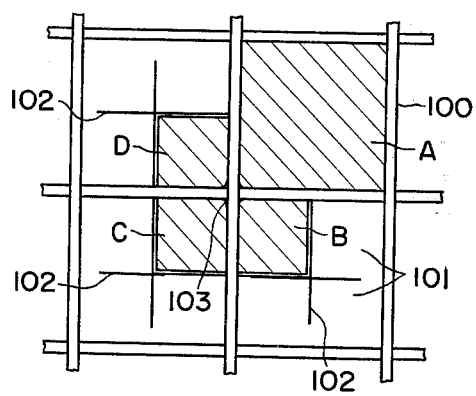
FIG. 8 is a diagrammatic top plan view showing a condition in which some of the fuel assemblies about the in-core monitor have been removed.
Figure 9:
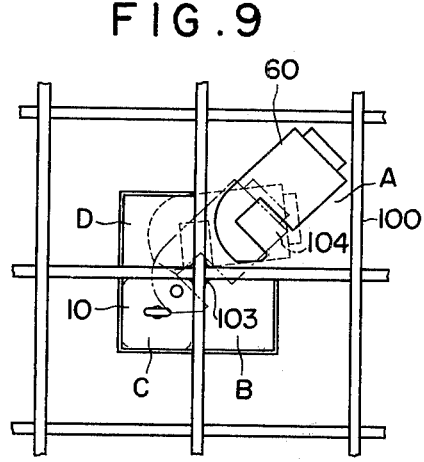
FIG. 9 is a diagram showing the manner of applying the cutter to the in-core monitor.
Figure 10:
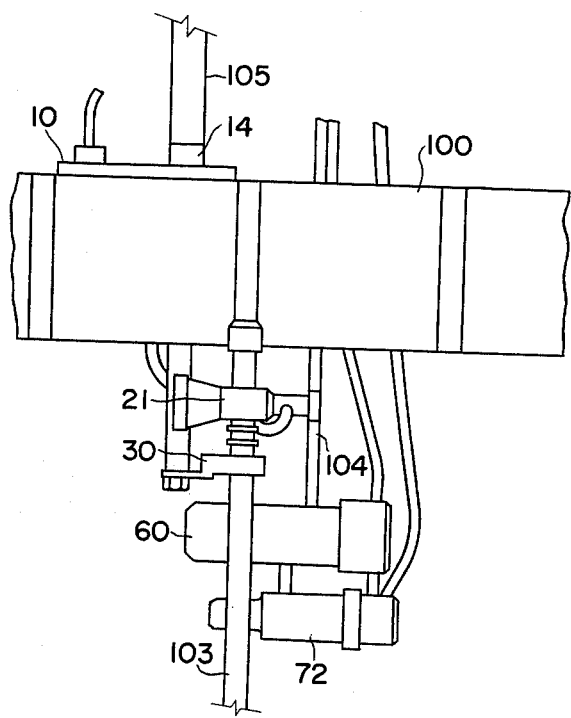
FIG. 10 is a diagrammatic side view showing the clamping device and the cutter have been applied to the in-core monitor.

The removing apparatus described above operates as follows. It is assumed that the spring of the in-core monitor sticks to its cylindrical casing so that it is impossible to remove the in-core monitor with a conventional tool. As shown in FIG. 8, in an ordinary nuclear reactor, the upper ends of fuel rod assemblies 101 are received in respective square shaped openings defined by grids 100 of the upper supporting plates, criss-cross shaped control grids 102 are inserted in the gaps of respective fuel rod assemblies and in-core monitors 3 are provided at a cross point between two grids 100. Each square shaped opening contains four fuel rod assemblies. To remove defective in-core monitors, as shown by hatched areas, four fuel rod assemblies generally represented by A and three assemblies B, C and D in square openings about the in-core monitor 3 are removed. Thus, a total of seven fuel rod assemblies are removed. Then cutter 60 with its clamping members 74 and 77 separated apart by introducing pressurized liquid into cylinder 80 is inserted into a vacant space corresponding to the removed fuel rod assemblies A with the longitudinal axis of the cutter aligned with a diagonal of the square opening as shown in FIG. 9. The cutter 60 is inserted from upper to a depth equal to the thickness of the grid 100 which is about 330 mm, for example. Then a hollow operating rod 104 having a square cross-section is fitted on post 96 to rotate the cutter 60 to a position indicated by dotted lines in FIG. 9 so as to hold a portion of the in-core monitor 103 between clamping members 74 and 77 of the holder 72. This can be accomplished by discharging the pressurized liquid from cylinder 80 thereby advancing the clamping member 77 by the force of spring 84. Then clamping device 10 is inserted into a vacant space corresponding to the removed assembly C which is diagonally opposite to assemblies A. Then shaft 14 is rotated by the operating rod 105, and a portion of the in-core monitor 103 above the portion thereof above the cutter 60 is held by the monitor holder 21 which is secured to the lower portion of shaft 14. At this time, clamping member 30 also holds a portion of the in-core monitor 103. In this manner, after holding two space apart portions near the upper end of the in-core monitor 103 by holder 72 which is integral with cutter 60 and holder 21, the movable cutting blade 63b is moved to the left as viewed in FIG. 5 by admitting pressurized water into cylinder 64 through inlet port 69 to sever the upper portion of the in-core monitor. The remaining portion of the in-core monitor is taken out of the core by rotating a little the operating rod 104 and then operating the cutter 60 and holding member in the reverse direction. The cut off portion of the in-core monitor is taken out of the core by depressing downwardly shaft 14 together with holder 21 against the force of spring 18 thus moving flange 17 from the first space 36a to the second space 36b, then rotating shaft 14 by operating rod 105 to bring the cut off portion beneath the main body 10 and finally taking out the main body to the outside of the reactor.

In this manner, according to this invention, even when the in-core monitor sticks to a structure inside the reactor and cannot be removed by a conventional method and apparatus, in accordance with this invention as the in-core monitor is severed into two portions by means of a pair of cutting blades at a point intermediate two supporting points, it is possible to efficiently seal the opening formed by cutting so as to prevent diffusion of the fission products into the reactor. Further, as two severed portions of the in-core monitor are firmly held by the springs, there is no fear of inadvertently drop the upper portion in the core. The lower portion is held upright on a portion of the core so that there is no fear of dropping it. Further, as resilient washers 95 are interposed between rods 90 and 91 interconnecting the cutter and holder, and the holder, cutting of the in-core monitor can be effected smoothly without applying undue force to the sheath of the in-core monitor, thus assuring effective sealing thereof.

What is claimed is:

1. In a nuclear reactor wherein four square shaped fuel rod assembles are disposed in respective square shaped openings defined by crossing grids of a upper supporting plate, and an in-core monitor is disposed at a cross-point of said grids, a method of removing said in-core monitor comprising the steps of removing four fuel rod assemblies from a square shaped opening having a diagonal passing through said cross-point, removing one fuel rod subassembly from each of three square shaped openings about said in-core monitor and having diagonals respectively passing through said cross-point, inserting a holder-cutter assembly into a large vacant space formed by removing said four fuel rod assemblies for holding the upper portion of said in-core monitor, inserting a clamping device into one small vacant space formed by removing one of said three fuel rod assemblies which is diagonally opposite said removed fuel rod assembly for clamping a portion of said in-core monitor which is spaced from the portion thereof held by the holder of said holder-cutter assembly, severing said in-core monitor into two sections by operating the cutter of said holder-cutter assembly, and removing to the outside of said reactor the severed two sections while they are held by said clamping device and said holder, respectively.

2. The method according to claim 1 wherein said holder-cutter assembly is inserted into said large vacant space with the axis of said assembly aligned with a diagonal of said large vacant space which passes through said cross-point, and then said holder-cutter assembly is rotated and advanced into another small vacant space.

3. In a nuclear reactor wherein four square shaped fuel rod assemblies are disposed in respective square shaped opening defined by crossing grids of a upper supporting plate, and an in-core monitor is disposed at a cross point of said grids, apparatus for removing said in-core monitor comprising a holder-cutter assembly adapted to be inserted into a large vacant space formed by removing four fuel rod assemblies from one of said square shaped openings, a clamping device adapted to be inserted into a small vacant space formed by removing one of said fuel rod assemblies about said in-core monitor, said clamping device including a vertical shaft operable in the vertical direction and a holding member for holding said in-core monitor, and means for operating said holder-cutter assembly and said clamping device from outside of said nuclear reactor.

4. The apparatus according to claim 3 wherein said holder-cutter assembly comprises a cutter including a pair of cooperating cutting blades and a piston-cylinder assembly for moving one cutter blade toward and away from the other cutter blade, a holder including a pair of cooperating clamping members, a piston cylinder assembly for moving one clamping member toward and away from the other clamping member, and means for interconnecting said cutter and holder into an integral assembly.

5. The apparatus according to claim 4 wherein said cutter is provided with an adaptor adapted to receive an operating rod.

6. The apparatus according to claim 4 wherein said interconnecting means is connected to said holder through resilient means.

7. The apparatus according to claim 3 wherein said clamping device further includes a main body provided with a vertical opening for receiving said shaft, spring means contained in said opening for biasing upwardly said shaft, and a protective cover secured to the bottom of said main body to surround said shaft and wherein said holding member is provided with a fluid pressure actuated member.

* * * * *